United States Patent
Houser et al.

[11] 3,880,226
[45] Apr. 29, 1975

[54] WATER QUALITY ANALYSIS SYSTEM WITH MULTICIRCUIT SINGLE SHELL HEAT EXCHANGER

[76] Inventors: Edwin A. Houser, 3400 Rosehedge Dr., Fullerton, Calif. 92634; Bernell W. Schwindt, 20525 San Gabriel Valley Dr., Walnut, Calif. 94396

[22] Filed: Feb. 27, 1974

[21] Appl. No.: 446,130

Related U.S. Application Data
[62] Division of Ser. No. 168,096, Aug. 2, 1971.

[52] U.S. Cl............... 165/11; 73/421.5 R; 73/422 R
[51] Int. Cl. .......................................... F22b 37/38
[58] Field of Search...... 165/11; 73/421 R, 421.5 R, 73/422 R

[56] References Cited
UNITED STATES PATENTS

| | | | |
|---|---|---|---|
| 2,687,185 | 8/1954 | McChesney | 73/421.5 R |
| 3,142,171 | 7/1964 | Royen | 73/15 R |
| 3,649,167 | 3/1972 | Sawyer | 73/422 R |

Primary Examiner—Albert W. Davis, Jr.
Attorney, Agent, or Firm—R. J. Steinmeyer; P. R. Harder

[57] ABSTRACT

A modular water quality analysis system for steam electric power generating plants is disclosed which includes a novel single shell multicircuit heat exchanger having means to individually vary the rate of flow of cooling water through each of the multiple circuits therein so that the single heat exchanger can simultaneously cool a plurality of samples entering it at widely differing high inlet temperatures to the same lower range of outlet temperatures. The heat exchanger has a physical construction such that it can be mounted on top of the system rack which contains a plurality of modules of apparatus for accepting water or steam samples from various test points in the power generating system, reducing the pressure and temperature thereof, directing and metering the flow of samples, and performing analyses for such water characteristic as pH, specific or cation conductivity, dissolved oxygen, sodium content and the like. The fact that the single shell heat exchanger can be mounted on top of the system rack and thereby replace a plurality of individually manifolded and valved heat exchangers formerly mounted at the back of the rack makes possible a considerable saving in cost, space and weight, a greater flexibility in system layout design, together with greatly improved access to the system components for adjustment and maintenance purposes, and faster instrument response due to shorter sample tubing runs. This flexibility of design in the modular system also permits the same basic apparatus to be adapted to a large variety of different sizes and types of power generating plants having different analysis requirements thereby providing a custom installation for each plant which nonetheless retains all of the advantages of standardized design and equipment.

6 Claims, 14 Drawing Figures

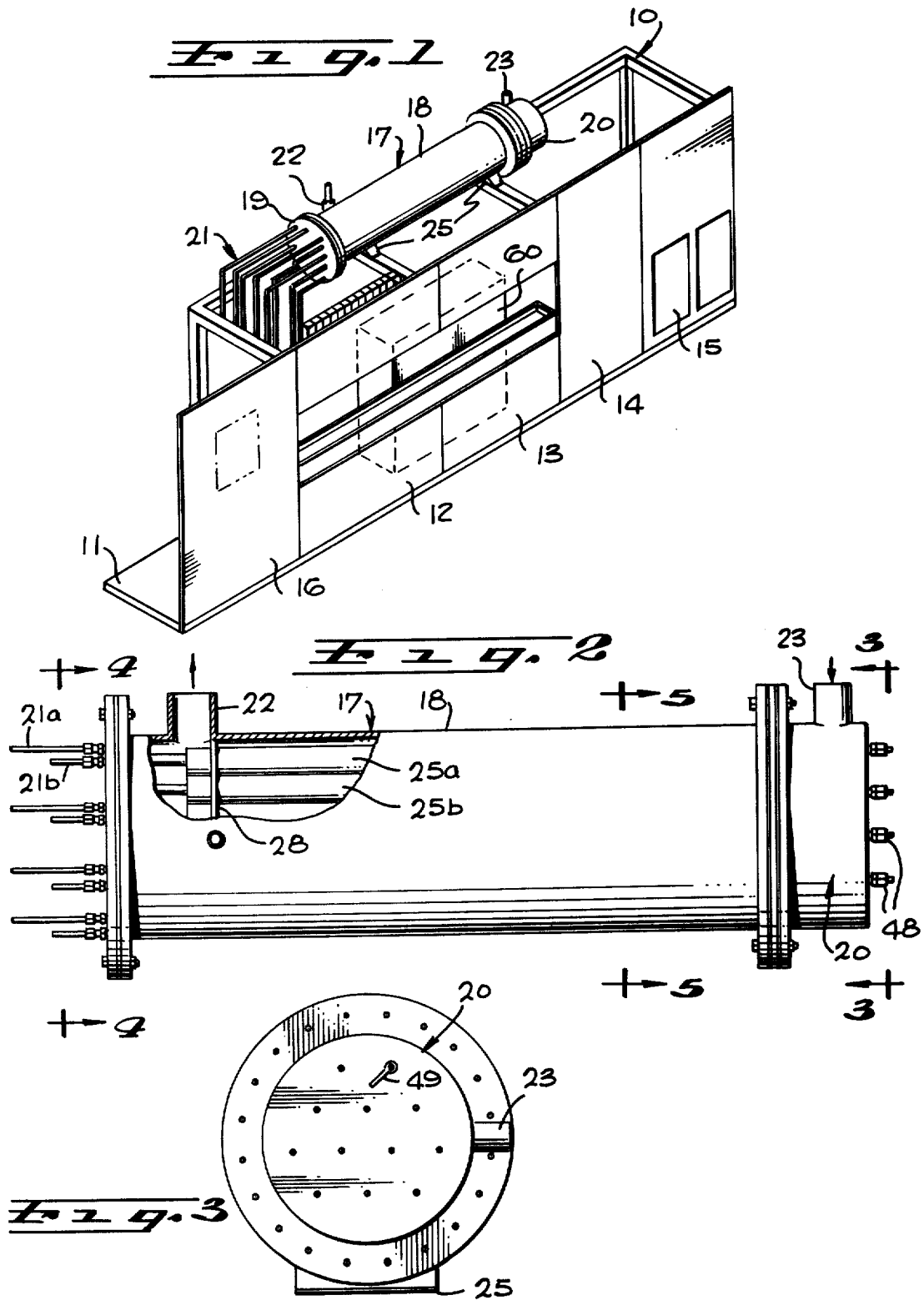

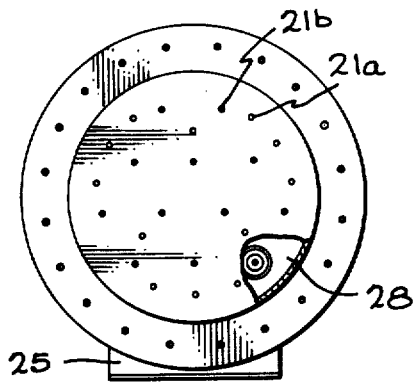
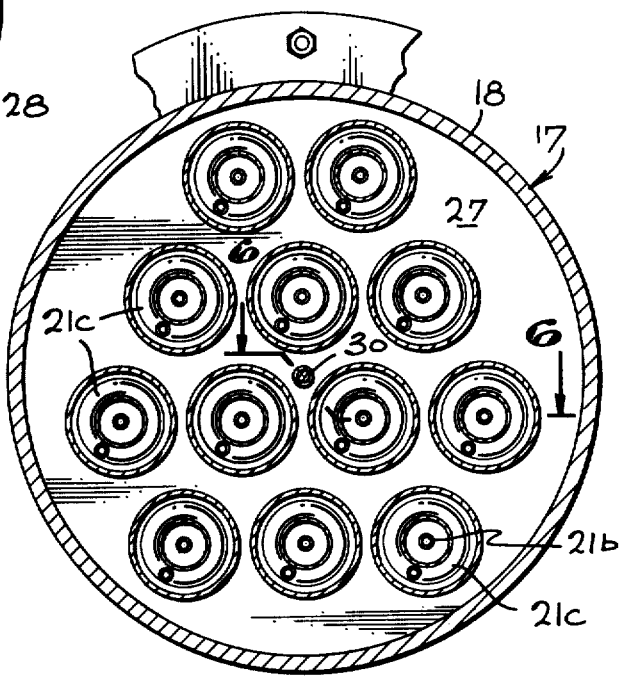
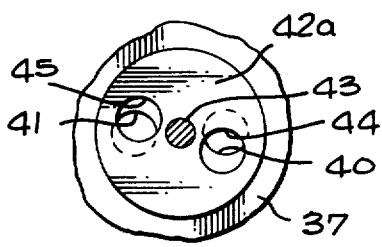
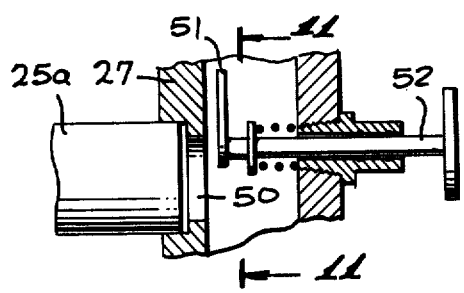
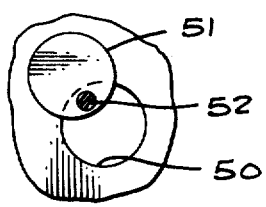
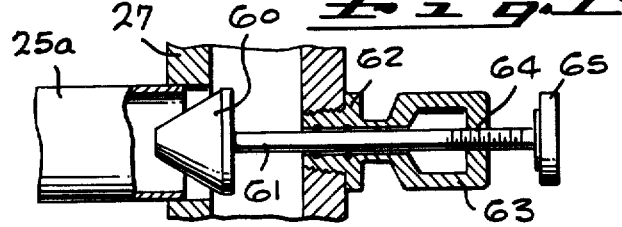

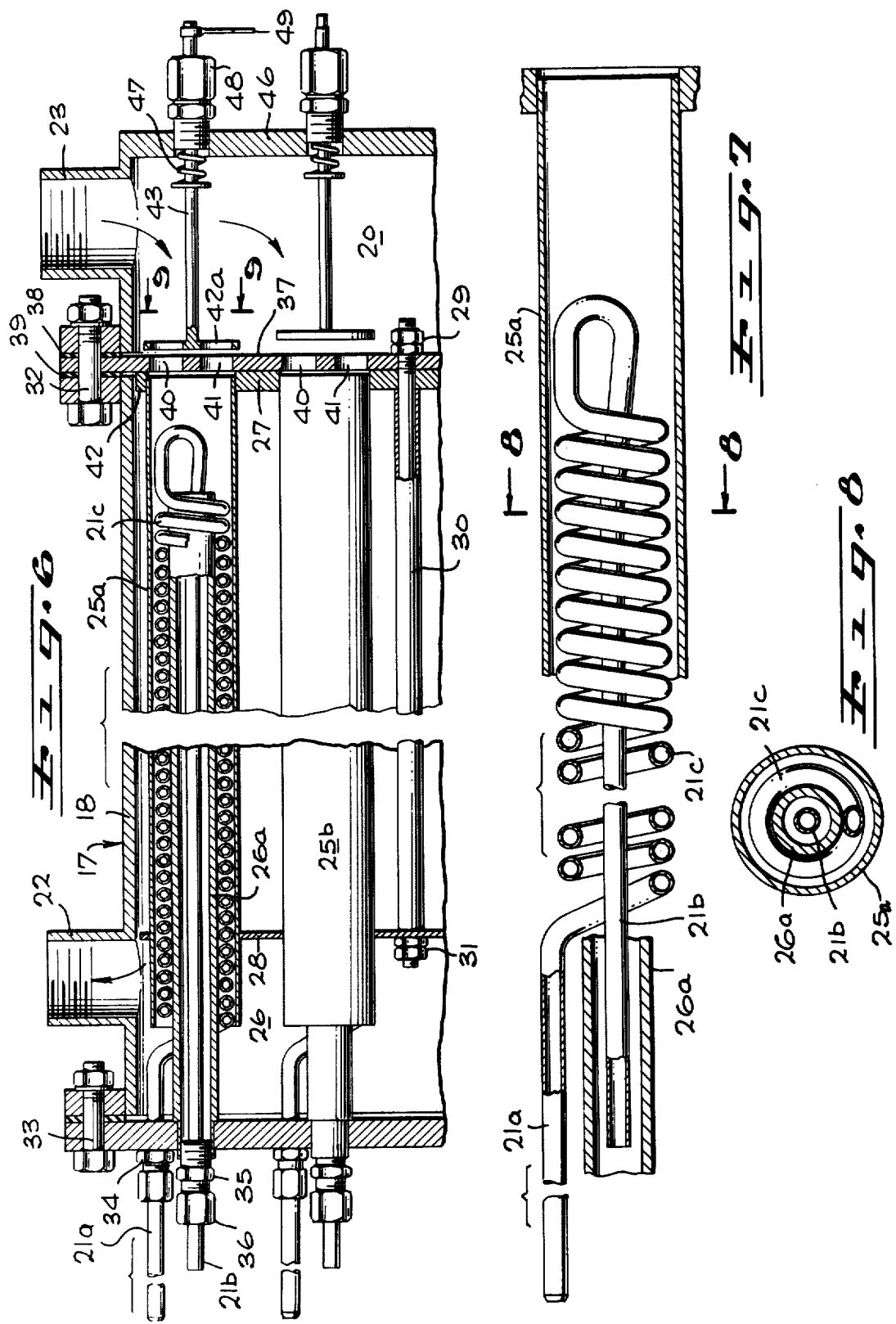

WATER QUALITY ANALYSIS SYSTEM WITH MULTICIRCUIT SINGLE SHELL HEAT EXCHANGER

This is a division of our copending application Ser. No. 168,096, filed Aug. 2, 1971.

BACKGROUND OF THE INVENTION

Field of the Invention

The present invention relates in general to a single shell multicircuit heat exchanger particularly adapted for use in a modularized water quality analysis system for steam power generating plants. The efficient generation of huge quantities of electrical energy has increased generating plant size and raised thermal operating conditions to the point where plants of over one thousand megawatts capacity per unit, through a single turbine-driven generator, are becoming common. The capital investment required for such a plant is of the order of a hundred and fifty to two hundred million dollars per unit. Many plants consist of four or more such units side by side. Because of this high cost and large scale, on-stream time must be kept as high as possibly (i.e. down time must be minimized) to insure maximum return on investment and to minimize effects of station-outage on the entire electrical system. Of the many factors affecting steam-plant operation, proper water quality management is one of the most vital. Maintaining specification water and steam purities to very small tolerances at very low impurity levels will certainly result in greatly reduced plant maintenance, and may even prevent total plant shut down. Continuously high water quality can only be maintained by accurate analyses which, in turn, at these low impurity levels, can only be made on samples the temperature of which is accurately known and controlled.

That is, because water purity cannot be controlled unless actual water state is first known, accurate water and steam impurity analysis forms the basis of a water quality management program for such plants. Impurities can enter the power plant cycle in three general ways: first, in make up water added to the system; second, by leakage from the atmosphere or cooling water; or third, by formation in corrosion reactions within the process. The object of water quality management is to measure and control impurities and additives from any of these sources. The most common measurement is solution conductivity, which measures all ionic species, thus giving a broad-spectrum indication of overall purity. Next comes pH analysis which is most important in corrosion control. Specific chemical species usually determined include dissolved oxygen, dissolved hydrogen, sillica, hydrozine, and sodium ion. In some systems phosphate ion, copper or iron may be important. Turbidity may also be measured.

All of the additives or impurities can be measured using a variety of instrumental techniques on samples derived from various points in the generating plant cycle and taken initially at widely varying inlet temperatures. Accurate analysis, however, requires that most test samples be reduced to a common known standard temperature. Such analysis is normally carried out in continuously operating automatic analysis systems adapted to perform many tests on many samples according to the particular needs of the power generating plant being monitored. The multicircuit heat exchanger of this invention makes possible such a system in which the necessary standardized test sample temperature can more easily be achieved in spite of widely varied sample inlet temperatures and flow rates.

Description of the Prior Art

In the past such automatic analysis systems when they were mounted on a system rack containing the plurality of analysis instruments for each particular test, the associated control and readout devices, the stream switching means for sending samples from given points to various analysis instruments, and the various temperature and pressure regulating means for the samples being monitored, were unnecessarily cumbersome and awkward to use by virtue of the fact that the first stage temperature and pressure reduction of samples at inlet temperatures varying from 165° to 1100° F was carried out by a plurality of separate individually manifolded heat exchangers each having its own individual cooling water rate control valve all mounted on the back of the system rack, the front of which was also closed by the usual front panels. This cumbersome arrangement made access to the interior of the rack for servicing and adjustment of the apparatus therein difficult and took up needless space. In those systems which did not use individual first stage coolers for each sample, the heat exchangers used did not meet the relevant standards of the American Society for Testing and Materials which, in particular, require that all sample tubing coming in contact with cooling water be continuous nonwelded tubing. Also, prior art attempts at first stage multiple-coil heat exchangers were not constructed or located so as to permit the removal of a single tube coil from the heat exchanger when necessary, nor did they permit the individual control of cooling water flow rate through each circuit to accomodate the above noted fact that sample inlet temperatures vary from 1100° down to 165° F and that most samples have different flow rates. The individual first stage heat exchangers, on the other hand, took up a great deal of panel board space and were costly to install.

In water quality systems heretofore manufactured, and indeed in the present system, there is second stage cooling by a second heat exchanger which accepts samples from the outlet of the first stage heat exchanger which samples have been reduced to a temperature range of 90° to 105° F and further cools these samples to 77° ± 1° F in order that analyses carried on by the downstram instrumentation will not have their accuracy affected by unknown or varying temperature conditions. Such a second stage heat exchanger is obviously designed to meet different requirements. Although it is an open tank non-pressurized heat exchanger, it is illustrated in the drawings herein as prior art.

Additionally, in the field of general heat exchange structures previously developed in many different arts, applicant is aware of the teachings of the below listed United States Patents none of which are believed to be anticipatory of the invention disclosed an claimed herein. These U.S. Pat. Nos. are as follows: Re. 21,257; 1,118,196; 1,810,165; 2,602,664 2,766,968; 2,895,719; 2,908,485; 3,100,523; 3,269,141; 3,302,700; 3,305,002; 3,450,198.

SUMMARY OF THE INVENTION

The present invention contemplates a modularized water quality analysis and management system for steam electric power generating plants of the type discussed above wherein a single shell multicircuit heat exchanger is mounted on top of the system rack containing the various apparatus modules necessary to the system. These modules normally comprise a first high temperature and pressure reduction module, a second low temperature and pressure reduction module, a third stream switching and flow metering module, and finally an analyser module containing apparatus for performing the various tests deemed necessary in any given installation. The fact that the heat exchanger is so constructed that it can be placed on top of the system rack thereby replacing the large number of individual heat exchangers formerly mounted at the back of the rack, permits a great economy and flexibility in design of the system. The construction of the heat exchanger is such as to permit such a location consistently with the overall system's requirements. These requirements are that the sample inlet, outlet and cooling coil tubing be continuous throughout the cooling water media in the sense that there are no welds or other seams or joints. It will be understood that such welds can give rise to the possibility of leakage causing cross contamination should a weld fail. The necessary individually variable cooling capacity using continuous tubing is accomplished by the unique baffling arrangement inside the single heat exchanger shell which is disclosed in detail below. Additionally, the heat exchanger is such that individual coils of sample tubing may be removed from the exchanger if necessary for replacement or repair without destroying the cooling water flange or other portions of the overall heat exchanger. Finally, each of the individual sample cooling circuits is isolated from all other circuits and individual means for regulating the rate of flow of cooling water through each circuit are provided in order to accomodate the varying inlet temperatures and flow rates of the individual samples. If desired, the individual flow rate adjusting mechanism can be operated from outside of the heat exchange shell so that rates can be varied during operation of the system without disassembling of the heat exchanger unit.

BRIEF DESCRIPTION OF THE DRAWINGS

FIG. 1 is a front perspective view of the water quality analysis system showing the sample conditioning and analyser front panel, the system rack, and the multicircuit heat exchanger mounted on top of the rack.

FIG. 2 is a top plan view, partly broken away, of the multicircuit heat exchanger shown in FIG. 1.

FIG. 3 is an end view of the heat exchanger taken on the line 3—3 of FIG. 2 and showing the flow rate adjustment points.

FIG. 4 is an end view, partly broken away, taken on the line 4—4 of FIG. 2 and showing the arrangement of sample inlet and sample outlet tubes to the heat exchanger.

FIG. 5 is a sectional view taken on the line 5—5 of FIG. 2.

FIG. 6 is a sectional view taken on the line 6—6 of FIG. 5.

FIG. 7 is an enlarged sectional view of one of the cooling coil circuits shown in FIG. 6 with parts broken and exploded to illustrate the manner in which a single coil may be removed from the heat exchanger.

FIG. 8 is a sectional view taken on the line 8—8 of FIG. 7.

FIG. 9 is an elevational view taken on the line 9—9 of FIG. 6 and showing a first restriction arrangement for regulating the rate of flow of cooling water into an individual circuit or spool of the heat exchanger.

FIGS. 10 and 11 are respectively sectional and end elevational views of a second alternative flow rate adjusting mechanism.

FIG. 12 is a sectional view of a third alternative flow rate adjustment mechanism.

DESCRIPTION OF THE PREFERRED EMBODIMENT

Figure 13:
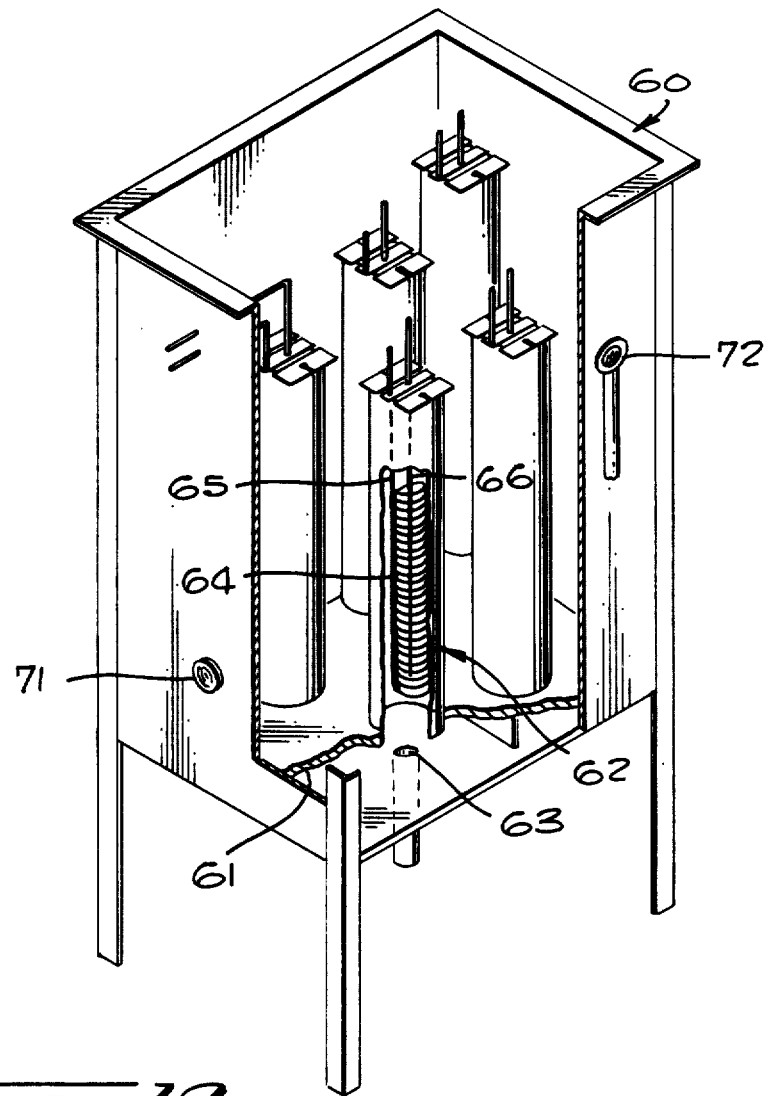
FIG. 13 is a broken away perspective view of a prior art second stage heat exchanger used for low temperature sample heat exchangers in the present system.

Turning now to FIG. 1 there is shown a front perspective view of a water quality analysis and management system for steam generating plants of the above discussed type wherein a plurality of water and steam samples at widely varying inlet temperatures are reduced to a common lower outlet temperature range so that a plurality of separate analyses may be performed on the samples. The system shown in FIG. 1 is mounted on a system rack 10 which, structurally, is a rectangular box-like frame of steel members extending upwardly from a base 11 to define a protected area within which the various modules of apparatus may be mounted. The frame 10 is initially open at the top and all four sides. The front of the frame is substantially closed by solid front panels for the individual modules of apparatus mounted behind them. Thus, apparatus for a high temperature and pressure module is mounted behind front panel 12; apparatus for a low temperature and pressure module is mounted behind front panel 13; apparatus for stream switching and readout is mounted behind or on front panel 14; and apparatus and instruments for automatically performing the various sample analyses is mounted behind front panel 15. In some installations another front panel 16 is provided behind which is mounted the temperature control module which is in fact a refrigeration system to supply closed cycle constant temperature cooling water to the second stage heat exchanger for finish conditioning the samples in the low temperature and pressure module behind panel 13. The details of the various controls, valves, meters and other apparatus comprising the entire system will not be described herein since they are well known in the art and conform generally to the description given above.

Mounted on top of the system rack 10 is a closed single shell multicircuit heat exchanger 17. The heat exchanger has a single exterior cylindrical shell 18 which is secured to an endplate 19 as will be described in detail below. Detachably secured to the other end of the cylindrical shell 13 is a first or water inlet plenum chamber 20 which also serves to close the end of heat exchanger shell 18. Extending from apparatus mounted in the rack 10 and thence upwardly and transversely to the endplate 19 of the heat exchanger are a plurality of pairs of water and steam sample conducting tubes which are indicated generally by the reference character 21. The pairs of sample conducting tubes extend into the heat exchanger through the endplate 19 and thence through a second plenum chamber 26 inside the heat exchanger which communicates with the water outlet conduit 22 in a manner described in detail below. The water inlet conduit 23 is connected to the first plenum chamber 20 on the opposite end of the heat exchanger and supplies cooling water under pressure which is flowed through a plurality of separate circuits inside the heat exchanger shell 17 from the first to the second plenum chamber and thence to water outlet 22.

Each of the plurality of pairs of water and steam sample conducting tubes has one tube for sample inlet and the other tube for sample outlet. It follows, of course, that within the heat exchanger the two tubes are merely different portions of a continuous coil of sample tubing arranged inside the heat exchanger in a manner to be described in detail below.

As can best be seen in FIGS. 2 and 3, the end wall of plenum chamber 20 has protruding there through a plurality of shafts 43 which may have a handle 49 attached thereto so that rotation of the handle and shaft will operate flow restriction means to be described below to individually vary the rate of flow of cooling water placed in heat exchange with each of the sample flow paths formed by said pairs of sample tubing in the heat exchanger so that the single housing multicircuit heat exchanger can simultaneously cool samples entering it at widely different inlet temperatures to substantially the same lower range of outlet temperatures.

The mounting of the heat exchanger on top of the rack as shown in FIG. 1 permits the front of the rack to be substantially closed by the necessary front panels while still permitting access to the various valves, sinks, motors, pumps, and like which are mounted in back of the front panels. With the heat exchanger positioned on top of the rack replacing individually manifolded and valved heat exchangers formerly mounted vertically on the back of the rack, it is now possible to obtain access to the equipment through the open back of the rack while still performing the same cooling function more efficiently and at reduced cost. The physical mounting of the heat exchanger to the rack is achieved by means of a pair of mounting brackets 25, which are bolted to mounting flanges formed integrally with the heat exchanger shell 17 and which are then secured in any convenient fashion to the system rack 10 so as to detachably mount the heat exchanger on the rack.

Turning now to FIG. 2 through 6 it will be seen that the sample of water or stream to be analysed enters the heat exchanger through inlet tube 21a and passes through the cooling water medium by means of the coiled sample tube 21c which terminates in a return run or sample outlet tube 21b. Thus, each pair of sample conducting tubes indicated generally at 21 in FIG. 1 is seen to comprise an inlet tube 21a, an outlet tube 21b, and a coil of heat exchange sample tubing continuous with the inlet and outlet tubings best seen at 21c in FIG. 6. The cooling water enters the heat exchanger under pressure through the cooling water inlet 23 in plenum chamber 20 and passes through each of a plurality of baffle spools 25a, 25b, etc. extending between plenum chamber 20 at the inlet end of the heat exchanger 17 and a second plenum chamber 26 at the outlet end of the heat exchanger. Cooling water then exits through outlet 22 communicating with plenum chamber 26 after passing in countercurrent heat exchange relationship with the coil 21c.

It will be noted that each of the sample cooling coils such at the coil 21c is mounted within a spool baffle such as the baffle 25a the inner diameter of which defines the maximum cross section of an individual flow path placing cooling water in countercurrent heat exchange relationship with the sample flowing through tube 21c. The tube 21c is coiled around an inner baffle 26a which is a hollow cylinder closed at both ends except for apertures in sealing relationship to the outlet tube 21b which extends axially through the inner hollow cylinder 26a for the complete return run through the center of the coil.

The spool baffle 25a, and all other spool baffles similar to it (there being one such spool baffle and coil arrangement for each circuit of the multicircuit heat exchanger), is mounted by a press fit between a first closure plate 27 at the inlet end of the heat exchanger and a second closer plate 28 at the outlet end of the heat exchanger. The closure plate 28 is supported within the heat exchanger shell 17 in a manner described below and cooperates with the endplate 19 and the shell 18 to form the outlet plenum chamber 26. The closure plate 27 is attached to the inlet end of the shell 18 between the shell and the inlet plenum chamber 20 and cooperates with the flow restriction apparatus in a manner to be described below.

From FIGS. 2 through 6 it will be noted that cooling water enters the heat exchanger through the inlet 23 and into inlet plenum chamber 20 and then divides so as to flow through each of the spools 25a, 25b, etc. which define individual flow circuits within the heat exchanger. As best seen in FIGS. 3 and 5, there are twelve such circuits in the device. Water exiting from each of the baffle spools enters plenum chamber 26 and exits through cooling water outlet 22 having passed in counterflow relationship to the sample flowing through the sample coils such as coil 21c. It will be understood that the heat exchanger may contain any reasonable number of individual circuit defining spools. In practice it is common to use five, ten, twelve of fifteen spools in an individual exchanger.

It should be noted that the dimensions of the plenum chambers are large by comparison to the flow cross section of each individual spool so that the supply impedance to water flow is low by comparison to the impedance of any individual spool. This relationship permits the rate of flow of cooling water through each individual baffle spool to be varied independently without affecting the rate of flow through any other baffle spool. That is to say, there is no cross coupling in view of the fact that supply impedance is low by comparison to the individual circuit impedances. Returning now to the mechanical construction of the heat exchanger, particularly as seen in FIGS. 2 through 6, it will be noted that the endplate 19 is provided with mounting holes and a plurality of nut and bolt assemblies 33 which secure the heat exchanger shell 18 to the endplate 19 by means of the nut and bolt passing through a flange on the end of the shell 18. When it becomes necessary to replace an individual sample coil assembly either because of accumulated deposits, change in operating requirements, or the like, the first step in doing so is to unfasten the means mounting the heat exchange shell 18 to the rack 10 and to next remove the bolts 33 holding the shell 18 to the endplate 19. The shell 18 may then be slid back. Of course it will be understood that in order to perform this operation it is necessary to shut down the analyser system and drain the entire heat exchanger. To remove an individual sample coil 21c the user can unloosen the nuts 36. It will be seen that the closure plate 27 and the plenum chamber 20 are attached to a flange on the end of heat exchanger shell 18 by the nut and bolt assembly 32 in much the same fashion that the shell 18 is attached to the endplate 19 by the nut and bolt assemblies 33. The closure plate 27 extends transversely of the cylindrical shell 18 at one end thereof and is connected to the central standoff member 30 which mechanically supports the other closure plate 28 which is secured thereto by standoff nut 31. Closue plate 28 similarly extends transversely of the interior of the shell 18 at the other end thereof.

Each of the closure plates 27 and 28 has a plurality of apertures therein, the apertures being round holes of the size adapted to receive the spool baffles 25a and being positioned in spaced opposed relationships to each other to facilitate the construction shown particularly in FIGS. 5 and 6. When the heat exchanger is first filled with cooling water there will be flow into the interior of the shell between the closure plates 27 and 28 and outside of the spool baffles 25a through an aperture in any convenient location in closure plate 27. This water in the exchanger is essentially stagnant and provides minimum heat transfer. The shell is provided with an airvent at the top to permit venting while it is thus being filled and with a drain at the bottom to facilitate draining when necessary. As noted above, the inlet cooling water plenum chamber 20 is bolted to the shell 18 by the same nut and bolt assemblies 32 which secure closure plate 27 thereto. The outlet cooling water plenum chamber 26 is formed by the shell 18, the endplate 19, and the closure plate 28 in which the outlet end of the spools 25a are mounted.

Considering now the details of each individual cooling coil assembly, it will be noted that the inlet tubing 21a is mounted in a drilled out tube fitting 34 through which it passes through endplate 19 and is then wound around the inner cylindrical baffle 26a inside the spool baffle 25a. The cooling coil 21c extends the full length of the spool baffle 25a having a small clearance from its inner diameter. The coil 21c may be finned if desired. The coil 21c terminates in the return sample tube 21b which extends continuously with it and returns through the inner baffle 26a. It will be noted that the inner baffle 26a extends through plenum chamber 26 and is mounted on the endplate 19. The return tubing 21b at this point is also supported by a drilled out fitting 35 and nut 36. When it is desired to replace an individual coil the sample conducting tubing must be severed outside of the heat exchanger so that the new coil can be connected to the existing tubing outside of the heat exchanger so as not to bring any welded portion of tubing in contact with cooling water. This requirement is in conformity with ASTM designation D1192/64 which is the "Standard Specification for Equipment for Sampling Industrial Water and Steam" promulgated by the American Society for Testing and Materials and approved by the American Standards Association.

In normal operation the inner cylindrical baffle 26a serves to reduce the cross sectional cooling water flow area inside the spool baffle 25a and thereby increase the velocity of cooling water flow at any given inlet pressure. The preferred mechanism for individually varying the rate of flow of cooling water placed in heat exchange relationship with each of the sample tube coils within a particular heat exchange circuit formed by particular spool baffle 25a can best be seen from a consideration of the relevant details shown in FIGS. 6 through 9. It will be seen that the closure plate 27 receives the spool baffles such as spool 25a in a press or friction fit in apertures in the closure plate. Closure plate 27 is in turn welded or otherwise rigidly secured to aperture plate 37. The two plates are attached to standoff 30 by means of standoff nut 29. The assembly is also secured to a flange on the heat exchange shell 18 by means of the nut and bolt assembly 32. Appropriate seals are of course provided at the junctions of the members, reference being particularly made to gaskets 38 and 39 on opposite sides of the aperture plate 37.

The aperture plate 37 can be seen in plan view in FIG. 9. It will be seen that a pair of apertures 40 and 41 are provided in plate 37 so that the entire area of both the apertures 40 and 41 is opposite the larger aperture formed by the flange 42 on closure plate 27 within which the spool baffle 25a is received. Both of these apertures 40 and 41 if unobstructed would thus discharge into the spool baffle 25a. The actual percentage of these apertures which remains unobstructed can be varied by rotation of a control plate 42a which is mounted on a shaft 43. Control plate 42a is provided with apertures 44 and 45 which may be of the same diameter and relative position as the apertures 40 and 41. When the control plate 42a is rotated so as to align these respective sets of apertures, macimum flow rate is permitted. As the control plate 42 is rotated about shaft 43, a greater and greater percentage of misalignment occurs until eventually the solid portions of plate 42a may entirely close off the flow through apertures 40 and 41. Shaft 43 extends outwardly through the end wall 46 of plenum chamber 20 through any suitable bearing arrangement 47. Exterior mounting means 48 may be adapted to receive a detachable handle 49 so that the plate 42a can be rotated from outside of the heat exchanger while the apparatus is in operation to thereby vary the rate of flow of cooling water through the baffle spool 25a. It will, of course, be understood that each of the plurality of heat exchange circuits is provided with similar arrangement for control of the rate of flow of cooling water through that particular circuit. It will be noted that the positioning of the rotatable plate 42a for variably controlling the rate of flow of cooling water in the inlet plenum chamber 20 places the pressure drop across it in a direction such that it tends to urge the plate closed against the closure plate and control plate 37.

A second embodiment of water flow rate control means is shown in FIGS. 10 and 11. In that arrangement a single aperture 50 in varied in effective cross section by rotation of a disc 51 mounted on a shaft 52 which is journaled for rotation by an suitable mounting means 53 so that the shaft is eccentrically positioned away from the center of the aperture 50. Rotation of the disc 51 about the shaft 52 will thus be seen to vary the exposed area of the aperture 50. The shaft 52 in this embodiment may be provided with a permanent handle 54 also projecting outside of the heat exchanger shell.

In FIG. 12 there is illustrated a third embodiment of means for varying the rate of flow of cooling water through the individual circuits. In this embodiment the baffle spool 25a which seats in closure plate 27 has the aperture at its end opening controlled in effective cross sectional flow area by a conical valve member 60 which is mounted on the end of a shaft 61. The shaft 61 is journaled in a bearing member 62 and has threaded engagement with a housing 63 at aperture 64. The shaft 61 is provided with a handle 65 for rotation thereof. As the shaft 61 is threadedly turned so as to move the conical valve member 60 into the aperture at the end of spool 25a it will be obvious that less and less water can enter the spool. The maximum diameter of the conical valve member 60 is large enough to fully close the opening to the spool. As the shaft 61 is rotated so as to withdraw the valve 60 more and more of the area of the aperture at the end of the spool is exposed to thereby receive a greater and greater rate of water flow. If desired, the housing 63 can be open ended and can be provided with a threaded cap so that the shaft 61 terminates within the housing for adjustment by a screw slot in the end of the shaft.

In any of these arrangements the flow of cooling water through the individual spool is continuously variable. In view of the fact that each of the heat exchange circuits defined by the baffle spools are isolated from one another by these spools, this individual variation of cooling water flow rate in one circuit may be used to meet the cooling requirements set by the inlet temperature and flow rate of the sample coming to that circuit without affecting the cooling rate established by similar but numerically different requirements in an adjacent heat circuit. The system design requirement is that samples placed in heat exchange with cooling water entering the exchanger at 90° F should emerge from the heat exchanger with outlet temperatures in the range of 90° to 105° F. In order to meet this requirement with respect to samples whose inlet temperatures may vary from 165° to 1100° F and whose flow rates also may be varied it will be realized that the individual flow rate adjustment is an essential and critical feature. If necessary it is also possible to connect two cooling coils in series by obvious exterior tubing connections. The ability to make the water rate flow adjustment is enhanced by the fact that the heat exchanger is a pressurized system provided with plenum chambers at both ends and by the additional utilization of the inner cylindrical baffle within each spool baffle to reduce the cross sectional flow area therein.

These design requirements and these structural features are not present in the second stage or low temperature heat exchanger which is shown in FIG. 13. This low temperature second stage heat exchanger accepts samples which have been reduced in temperature by the heat exchanger described above. These samples, as noted, are in a temperature range of 90° to 105° F. In this second stage heat exchanger the samples are reduced to 77° ± 1° F by heat exchanging them against water circulated in a closed cycle through a refrigeration system mounted in the temperature control module 16 which holds the cooling water at 75° F. This second stage heat exchanger is used in the present system as a conventional element thereof and has also been used in previous commercial systems.

In commercial practice the heat exchanger shown in FIG. 13 is referred to as a "baffled bath". The device consists of a simple rectangular tank 60 having a barrier plate 61 which serves as a base plate across it a few inches from the bottom. Attached to the plate is a group of thick-wall PVC pipes 62 extending to within a few inches of the bath top. The pipes are open at the top and bottom so they and the plate form a baffle system for distributing cooling water entering the bottom of the bath through temperature controlled water inlet 63. Cooling water from the refrigeration system is supplied through piping connected to this inlet and floods upwardly through the baffled bath to form a fountain effect. The system is thus not a closed pressurized system, but rather is open to atmosphere at its top. A coil of stainless steel sample tubing 64 is placed within each baffle pipe and is connected so that the flow of coolant is generally countercurrent to the flow of sample. The sample inlet may be seen at 65 in the detailed plan view shown in FIG. 14 the sample outlet is brought up through the center of the coil 64 and is shown at 66. It will of course be understood that the sample inlet supplied to 65 is derived from the first stage heat exchanger and that sample outlet from 66 is connected to be fed to the appropriate analyser.

Figure 14:
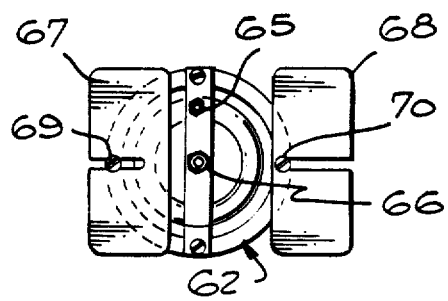
FIG. 14 is a detailed plan view on an enlarged scale showing one shutter mechanism used in the device of FIG. 13.

In addition there is a shutter arrangement as shown in detail in FIG. 14 at the top or coolant outlet end of each pipe so that the flow of coolant can be adjusted for each coil. This shutter is at the coolant outlet end of the unpressurized system and comprises the slidably adjustable shutter 67 and 68 which can be positioned by means of the screws 69 and 70 which clamp down on slots in the shutter members. Once sufficient coolant has been supplied to the pipes to fill them it overflows through the open tops and collects in the tank 60 outside of the pipes. It is then returned to the refrigerated coolant temperature control system through a connection in the side of the tank shown generally at 71. Leavel gauge valves 72 may also be provided. In the apparatus shown in FIG. 1 the baffled bath is mounted inside the system rack behind the low temperature module panel 13. This location affords short tubings runs from the first stage heat exchanger 17 to the baffled bath and in turn from the baffled bath to the analysers in the module in back of panel 15. These short tubing runs and the highly accurate and efficient temperature control assure the fast and accurate instrument response necessary to achieve maximum system effectiveness in spite of the widely varying inlet temperatures and flow of the water and steam samples received by the high temperature single closed shell multicircuit heat exchanger.

What is claimed is:

1. A water quality analysis system in steam generating plants of the type wherein a plurality of water and steam samples at widely varying inlet temperatures are reduced to a common lower temperature range so that a plurality of separate analyses may be performed on the samples, said system comprising:

a. a system rack having a plurality of apparatus modules mounted therein, said modules comprising at least a first high temperature and pressure module, a second low temperature and pressure module, a third stream switching and flow metering module, and an analyser module containing apparatus for performing said plurality of analyses, said system rack comprising a rectangular box-like frame having panels mounted on the front thereof and being open at the back and ends thereof to afford access to the apparatus of said modules;

b. a single closed shell multicircuit heat exchanger mounted on top of said system rack, said heat exchanger having a closed path for pressurized coolant flow therethrough;

c. a single coolant inlet means and a single coolant outlet means each operatively connected to said shell;

d. a plurality of pairs of water and steam sample conducting tubes extending from said rack mounted modules into said heat exchanger through one end thereof, one tube of each pair being for sample inlet and the other tube of each pair being for sample outlet, said pair of tubes uniting to form a continuous sample flow path within said heat exchanger; and e. means operatively associated with said heat exchanger to individually vary the rate of flow of pressurized coolant placed in heat exchange with each of said sample flow paths formed by said pairs of sample tubing in said heat exchanger so that said single housing multicircuit heat exchanger simultaneously cools samples entering it at widely different inlet temperatures to substantially the same lower range of outlet temperatures.

2. Apparatus as in claim 1 wherein the portions of each pair of sample conducting tubes inside said heat exchanger are formed of continuous nonwelded tubing, and wherein said heat exchanger can be partially disassembled to permit removal of said portion of any pair of sample conducting tubes inside said heat exchanger.

3. In combination with a water quality analysis system for steam generating plants of the type wherein water and steam samples at widely varying inlet temperatures must be reduced to a common lower outlet temperature range for a plurality of separate analyses, the improvement comprising a single shell multicircuit heat exchanger said heat exchanger comprising:

a. a closed heat exchanger shell;

b. a first plenum chamber at one end of said shell having cooling water inlet means connected thereto;

c. a second plenum chamber at the other end of said shell having cooling water outlet means connected thereto, said first and second plenum chambers being positioned in spaced opposed relationship to each other at opposite ends of said shell;

d. a plurality of hollow cylindrical baffle spools positioned inside said heat exchanger shell and detachably mounted between said first and second plenum chambers, each of said spools communicating with both of said chambers so that each spool defines the outer limits of a separate water flow path between said plenum chambers;

e. means to detachably mount a coil of sample tubing in each of said spools, each of said coils having a sample inlet tube and a sample outlet tube continuous therewith and both extending out of one end only of said spool and thence through one of said plenum chambers and out of one end of said heat exchanger; and f. separate means operatively associated with each of said spools to regulate the rate of flow of cooling water through that individual spool independently of the rate of flow of cooling water through any other spool.

4. Apparatus as in claim 3 wherein;

a. said cooling water is supplied to said first plenum chamber at above atmospheric pressure;

b. said sample inlet and sample outlet tubes extend through said second plenum chamber; and c. said flow regulating means comprise adjustable restriction means positioned at the inlet to each of said spools from said first plenum chamber.

5. Apparatus as in claim 3 wherein each of said coils of sample tubing is coiled around the outside of an inner closed hollow cylindrical baffle which is coaxial with said spool and which reduces the cross sectional area for flow of cooling water through said spool to increase its velocity at a given pressure.

6. Apparatus as in claim 5 wherein each of said inner closed cylindrical baffles extends out of its spool and through said second plenum chamber, said sample outlet tubes extending axially through the full length of said inner closed cylindrical baffle.

* * * * *